United States Patent [19]

Katoh et al.

[11] 4,249,673

[45] Feb. 10, 1981

[54] COMBUSTING DEVICE FOR GENERATION OF A COMBUSTION GAS

[75] Inventors: Masayoshi Katoh, Kawagoe; Takashi Ishii, Tokyo; Tadahiko Nagaoka, Sayama, all of Japan

[73] Assignee: Nissan Motor company, Limited, Yokohama, Japan

[21] Appl. No.: 13,137

[22] Filed: Feb. 21, 1979

[30] Foreign Application Priority Data

Mar. 2, 1978 [JP] Japan ................................. 53-23925

[51] Int. Cl.³ ..................... B01J 7/00; B60R 21/08; F42B 3/04
[52] U.S. Cl. ................................. 222/3; 102/39; 280/741; 422/305
[58] Field of Search ............... 222/3; 280/736, 737, 280/740, 741, 742; 137/68 A; 102/39 R, 37.7; 422/305

[56] References Cited

U.S. PATENT DOCUMENTS

| | | | |
|---|---|---|---|
| 2,597,641 | 5/1952 | Hull et al. | 102/39 |
| 3,972,545 | 8/1976 | Kirchoff et al. | 280/736 X |
| 3,986,456 | 10/1976 | Doin et al. | 280/741 X |

Primary Examiner—F. J. Bartuska

[57] ABSTRACT

A device comprising a perforated housing containing therein pellets of a chemical composition which undergoes self-sustaining combustion with generation of a combustion gas and an initiator attached to the housing to ignite the pellets. To prevent breaking of the pellets resulting from their movements in the housing, a hollow and resilient retainer member is placed in the housing such that the initiator is exposed to the interior of the retainer and that the pellets are spaced from the initiator by the retainer and held under a compressive force by the resiliency of the retainer. The retainer has openings which allow a gas to pass therethrough but do not allow the pellets to pass therethrough. A helical spring and a perforated bellows are examples of the retainer.

12 Claims, 10 Drawing Figures

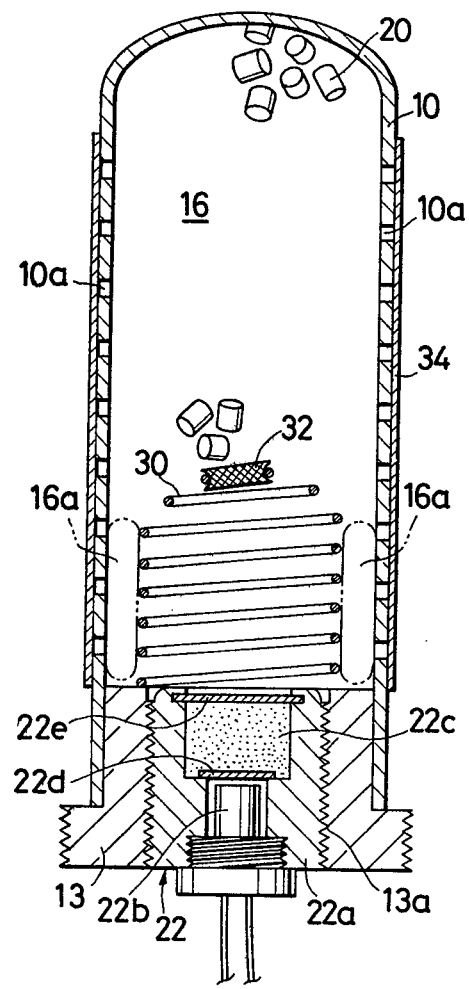
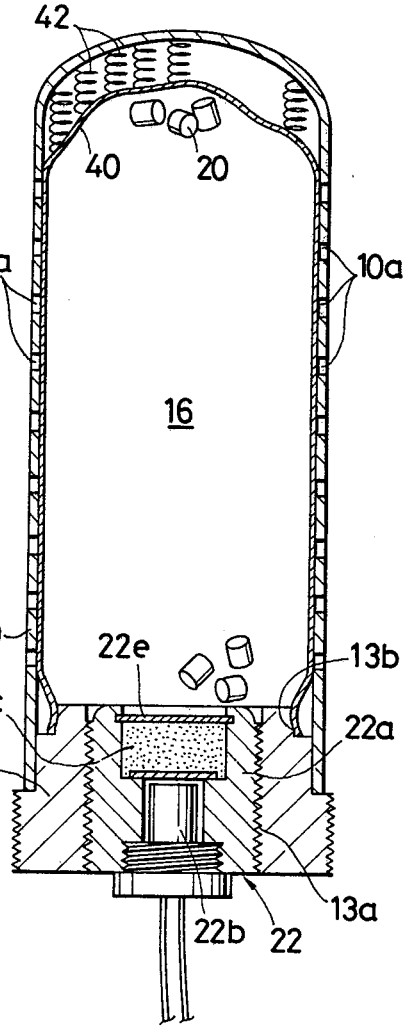
FIG. 2
FIG. 4
PRIOR ART

COMBUSTING DEVICE FOR GENERATION OF A COMBUSTION GAS

BACKGROUND OF THE INVENTION

This invention relates to a combusting device of the type comprising a perforated housing and encased therein tablets or pellets of a chemical composition which combusts with generation of a large quantity of gas, and more particularly to a buffer means in a device of this type for preventing breaking of the pellets before and during combustion. A device according to the invention can be embodied in a gas generator for an inflatable safety apparatus and an igniter for a rocket motor.

Some kinds of conventional safety or life-saving apparatus as exemplified by an inflatable safety bag for the protection of a car passenger from injuries in collision of the car are equipped with a gas generating device having a perforated housing and encased therein tablets or pellets of a chemical composition, usually a pyrotechnic composition, capable of producing a large quantity of gaseous reaction products in a short time upon combustion. In addition, a gas generator of this type includes a squib or initiator inserted into the housing to ignite the pyrotechnic pellets and usually contains a heat-absorbing material in the form of granules packed between the pyrotechnic pellets and the perforated wall of the housing to reduce the temperature of the reaction gas before discharge.

Also, many igniters for solid propellant rocket motors are constructed fundamentally similarly to the aforementioned gas generator except that the heat-absorbing material is excluded and that use is made of a pyrotechnic composition which generates a large amount of heat upon combustion as well as gaseous reaction products since the igniters are required to jet out a very high temperature gas or flame.

In a combusting device of the above described type, either in the case of a gas generator for a safety apparatus or in the case of an igniter for a rocket motor, the shape and dimensions of the tablets or pellets of the gas generating composition are determined carefully so as to realize an intended rate of combustion or gas generation at a suitable combustion pressure in the housing of the device. However, there is a possibility of cleaving or crushing of the pellets when the device is subjected to mechanical vibrations and/or shocks, for example, during carriage of the device on a car. If the pellets undergo combustion in a broken state, even partially, it is likely that the device will fail to exhibit an expected performance and that the combustion pressure will become excessively high because of an enlarged total surface area of the combustible pellets, resulting in rupture of the housing of the device in an extreme case.

Therefore, conventional combusting devices of the described type comprises certain means for holding the pellets of the gas generating composition in the housing practically motionless thereby to prevent breaking of the pellets. A typical example of such means is a spacer which is made of a relatively soft material such as a plastic foam or glass wool and interposed between the pellets and a non-perforated wall of the housing such that the pellets are packed closely in the housing under a compressive load. However, it is difficult to completely prevent movements of the pellets by the provision of such a spacer. Even when the pellets are kept unbroken before actuation of the device, the spacer will be forced to decrease its volume, causing an enlargement of the volume of a combustion chamber in which are disposed the pellets, as the pressure in the housing rises upon initiation of the combustion of the pellets. Then the pellets under combustion begin to move around in the combustion chamber and collide against each other, so that there occurs cleaving or crushing of a portion of the pellets before completion of combustion. Besides, the use of the spacer brings about an inconvenience to the assemblage of the combusting device. To dispose the spacer as designed, the assemblage of the device must be performed either by charging the housing with the combustible pellets after installation of the initiator to the housing or by inserting the initiator into the housing in a state packed with the pellets, so that there is the danger of an accidental firing of the initiator by collision or friction between the initiator and the pellets.

As an alternative technique employed in some of conventional gas generators, the combustible pellets are packed closely in a bag of cloth, plastic film or metal foil, and springs are disposed in a space between the outside of the bag and the inside of a housing wall so as to hold down the bagged pellets with a compressive force. However, this method, too, is not effective for preventing the pellets from moving around and breaking during combustion since the springs are compressed as the pressure in the bag rises, causing an enlargement of a space in which are confined the pellets. Besides, it is very troublesome to assemble the device using this method because of the need of closely packing the pellets in the bag without causing the bag to swell out beyond the inner diameter of the housing and thereafter inserting the bagged pellets into the housing without damaging the bag which is made of a thin and soft sheet material.

SUMMARY OF THE INVENTION

It is an object of the present invention to provide an improved combusting device of the type comprising, encased in a perforated housing, tablets or pellets of a chemical composition which combusts with generation of a large quantity of gas and an initiator attached to the housing to ignite the pellets, which device further comprises a novel type of retaining means for holding the pellets motionless not only until ignition of the pellets but also during combustion of the pellets thereby to surely prevent breaking of the pellets before completion of the combustion and, nevertheless, can be assembled easily and safely.

It is another object of the invention to provide an improved gas generator of the above described type for an inflatable safety apparatus such as an inflatable bag on an automobile.

It is a still another object of the invention to provide an improved igniter of the above described type for a rocket motor.

A device according to the invention comprises a housing which defines therein a combustion chamber and has at least one gas discharge aperture, a plurality of pellets of a chemical composition, which undergoes self-sustaining combustion with generation of a combustion gas which may be in the form of flame disposed in the combustion chamber and an initiator to ignite the pellets attached to the housing so as to be exposed to the combustion chamber. As a novel feature, this device further comprises a hollow and resilient retainer member placed in the combustion chamber. The retainer member is of an incombustible material and has at least one opening which is narrow enough to prevent each of the pellets to pass therethrough. The retainer member is made to rest on a wall of the combustion chamber in such an arrangement that the initiator is exposed to the interior of the retainer member and that the pellets are entirely spaced from the initiator by the retainer member and held under a compressive force by the resiliency of the retainer member.

For example, the retainer member may be a helical spring or a perforated bellows. It is preferable to use a generally conically shaped helical spring with its wider end on the aforementioned wall of the combustion chamber.

A device according to the invention can be designed either as a gas generator for a safety apparatus such as a inflatable bag on an automobile or as an igniter for a rocket motor.

BRIEF DESCRIPTION OF THE DRAWINGS

FIG. 2 is a sectional view of a rocket motor igniter as another embodiment of the invention;

FIG. 4 is a sectional view of a conventional igniter;

DESCRIPTION OF THE PREFERRED EMBODIMENTS

Figure 1:
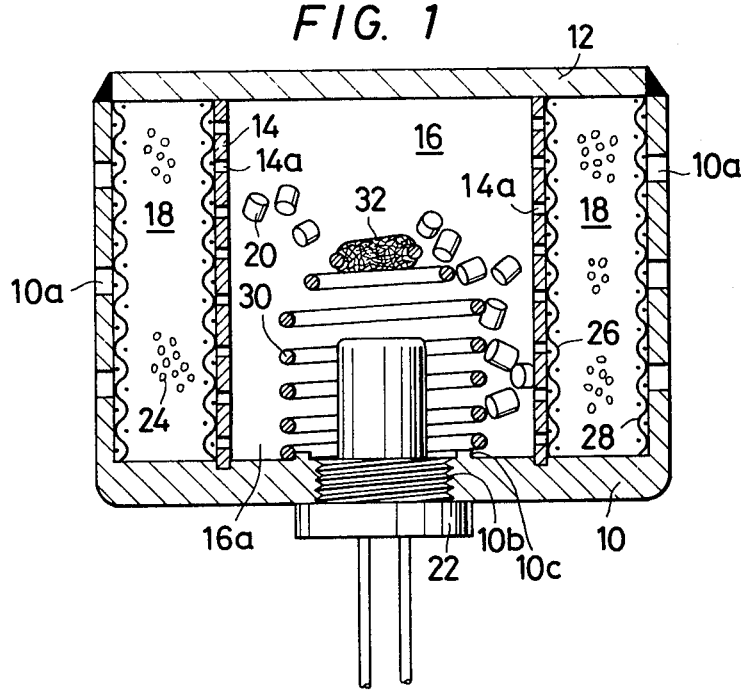
FIG. 1 is a sectional view of a gas generator as an embodiment of the present invention.

A gas generator of FIG. 1 is designed to jet out a gas from its cup-shaped housing 10 through a multiplicity of holes 10a bored in the peripheral wall of the housing 10. The open end of the cup-shaped housing 10 is closed by a lid plate 12, and a cylindrical partition 14 is fixedly and concentrically placed in the housing 10 to divide the interior of the housing 10 into a cylindrical combustion chamber 16 and an annular cooling chamber 18. However, the partition 14 has a multiplicity of radial holes 14a to provide communication between these two chambers 16 and 18. A multiplicity of pellets 20 of a solid phase chemical composition which undergoes self-sustaining combustion and generates a large quantity of combustion gas are disposed in the combustion chamber 16 in a manner as will be described hereinafter. Herein the term "pellets" should be construed as to include tablets, granules and relatively small blocks, mass or pieces of any other shape. An example of the gas generating chemical composition is a mixture of potassium perchlorate and sodium azide. An electrically initiatable squib or initiator 22 is secured to the housing 10 so as to intrude into the combustion chamber 16 using a tap hole 10a in the middle of the chamber 16 using a tap hole 10a in the middle of the bottom of the housing 10. The cooling chamber 18 is filled with granules 24 of a practically inert and heat-absorbing material such as alumina. The outer surface of the cylindrical partition 14 and the inner surface of the cylindrical wall of the housing 10 are covered with wire screen layers 26 and 28, respectively, to prevent the granules 24 from passing through the holes 14a and 10a.

As an embodiment of a resilient retainer according to the invention, a generally cylindrical helical spring 30 is disposed in the combustion chamber 16. The inner diameter of this spring 30 is somewhat larger than the diameter of the tap hole 10b for the installation of the initiator 22 and the length of the spring 30 is larger than that of the initiator 22 with respect to a portion intruding into the combustion chamber 16. The pitch of this helical spring 30, i.e. the width of the openings of the retainer 30, is smaller than the smallest dimension of the individual pellets 20. At one end, the helical spring 30 is fitted around an annular projection 10c formed on the inside of the bottom of the housing 10 so as to concentrically surround the tap hole 10b, so that the helical spring 30 surrounds the initiator 22 inserted into the combustion chamber 16 with a short distance therebetween. The helical spring 30 is assembled with the housing 10 so as to leave the space between the spring 30 and the initiator 22 completely vacant, that is, so as to permit none of the pellets 20 to be present in this space. Usually, an annular space 16a between the helical spring 30 and the cylindrical partition 14 is wide enough to allow the presence of the pellets 20 in this space 16a. The opening at the free end of the helical spring 30 is closed by a plug 32 of a soft, noncombustible and, preferably, gas permeable material to prevent the pellets 20 from entering the interior of the helical spring 30 through this opening. For example, a lump of a finely meshed wire screen or a wire cloth serves as the plug 32. The dimensions of the helical spring 30 are determined such that the pellets 20 are closely packed in the space outside of the helical spring 30 and as a whole pressed against the lid plate 12 and the cylindrical partition 14 by the force of the spring 30. The inner surfaces of the lid plate 12 and the cylindrical partition 14 may be covered with cushioning layers (not shown).

As will be understood from the foregoing description, the helical spring 30 prevents movements of the individual pellets 20 in the combustion chamber 16 before actuation of the gas generating device. Upon initiation of the initiator 22, the pellets 20 are ignited and undergo combustion to produce a combustion gas, which jets out of the housing 10 through the radial holes 10a after cooling during passage through the cooling chamber 18. Regardless of the magnitude of the combustion pressure in the combustion chamber 16, the helical spring 30 does not exhibit a substantial deformation since there occurs no difference in pressure between the exterior and interior of the helical spring 30. Accordingly there occurs substantially no change in the volume of the space in which the pellets 20 are packed, until the combustion nears completion, so that the pellets 20 do not move around in the combustion chamber 16 to collide against each other and hence do not break even during operation of the gas generator.

As an additional effect of the use of the helical spring 30 in the illustrated arrangement, a flame produced by the initiator can propagate uniformly in every directions since the pellets 20 are held appropriately distant from the initiator 22. This is quite favorable to the stabilization of the ignition characteristic of the pellets 20. Furthermore, if firing of the initiator 22 is accompanied with projection of debris towards the pellets 20, such debris can be trapped by the helical spring 30, or a differently embodied retaining means according to the invention, so that the pellets 20 have little chance of being hit by the debris and broken.

In FIG. 2, a device according to the invention is embodied in an igniter for a solid propellant rocket motor. Although different in shape and simplified by the omission of the heat-absorbing material 24 and the partition 14, this igniter is fundamentally of the same construction as the gas generator of FIG. 1. In this case the open end of the housing 10 is closed by a flanged plug 13, and the initiator 22 is screwed into a tap hole 13a of this plug 13. By way of example, the initiator 22 in this igniter has a cylindrical body 22a charged with a fast-burning explosive composition 22c and an electrically initiatable squib 22b. Indicated at 22d is a separator disc and at 22e is a closure disc. The material of the pellets 20 is a pyrotechnic composition which generates a large amount of heat as well as a combustion gas, so that this device jets out a blaze of fire through the holes 10a. An example of such a pyrotechnic composition is a mixture of potassium nitrate and boron. The outside of the housing 10 may be covered with a thin sheath 34 of a plastic film or a metal foil to close the holes 10a until ignition of the pellets 20. The generally cylindrical helical spring 30 provided with the plug 32 at its one end is similar to that in the device of FIG. 1. In this case it is not necessary to secure the helical spring 30 to the plug 13 since, as will be understood from the illustration, the helical spring 30 is put into an endmost region of the combustion chamber 16 after charging of the housing 10 with the pellets 30 and appropriately compressed against the pellets 30 when the plug 13 is fitted into the housing 10. The effects of the helical spring 30 in this igniter are identical with the effects of the spring 30 in the gas generator of FIG. 1.

Figure 3:
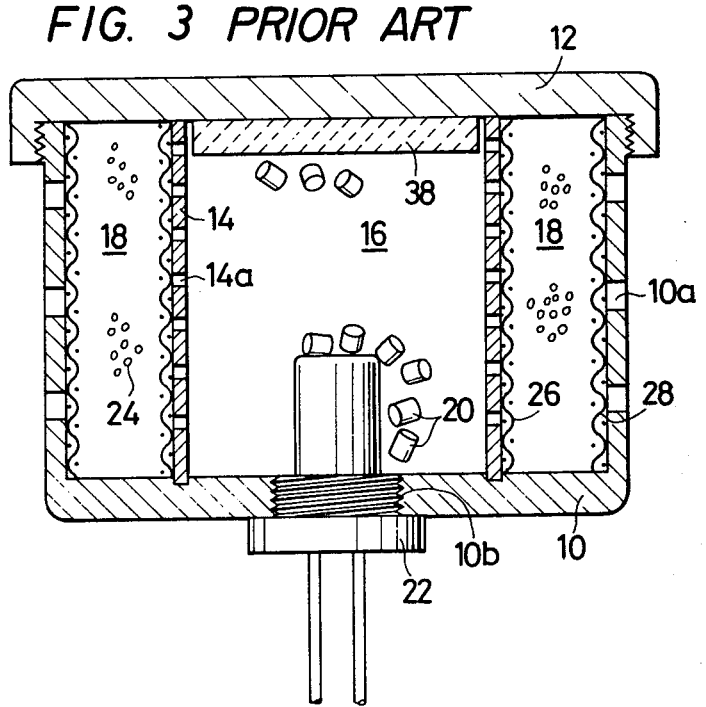
FIG. 3 is a sectional view of a conventional gas generator.

For comparison, FIGS. 3 and 4 illustrate conventional combusting devices mentioned hereinbefore.

A device of FIG. 3 is a gas generator corresponding to that of FIG. 1. In this device, the gas generating pellets 20 are disposed into the combustion chamber 16 without the provision of any means for preventing the pellets 20 coming into contact with the initiator 22 inserted into the combustion chamber 16. A disc-shaped spacer 38 of, for example, a foam plastic or glass wool is disposed in the combustion chamber 16 so as to occupy an endmost region adjacent the lid 12. This spacer 38 is thick enough to be pressed against the pellets 20 by the lid 12. However, the use of the spacer 38 is unsatisfactory and even disadvantageous in certain respects as described hereinbefore.

FIG. 4 shows an igniter which utilizes a bag 40 of a soft sheet material and springs 42 to hold the pellets 20 motionless. The bag 40 is packed with the pellets 20, and thereafter a mouth portion of the bag 40 is secured (either bound or adhered) to the plug 13 by utilizing a circumferentially cut and grooved region 13b of this plug 13. The springs 42 are first disposed in the housing 10 and thereafter the bagged pellets 20 are inserted into the housing 10 together with the plug 13 so as to press the springs 42 against the closed end of the housing 10. The troublesomeness of the assemblage of this igniter as mentioned hereinbefore will be apparent from the illustration.

Figure 5:
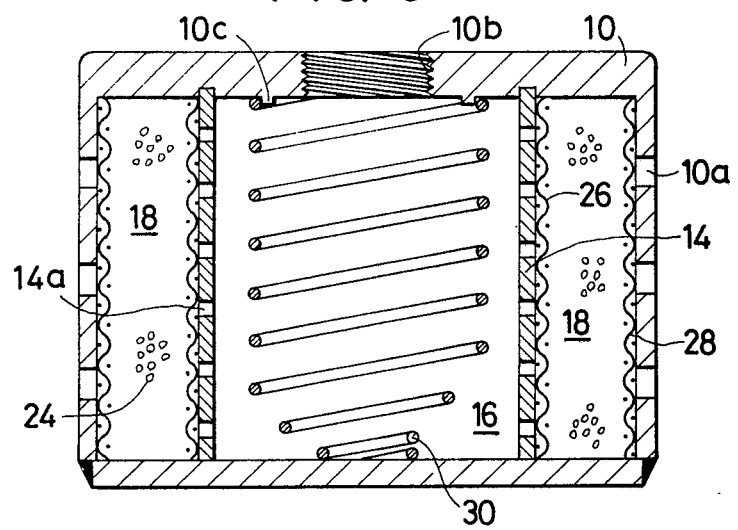
FIGS. 5 and 6 illustrate a method of charging the housing of the device of FIG. 1 with pellets of a gas generating composition.
Figure 6:
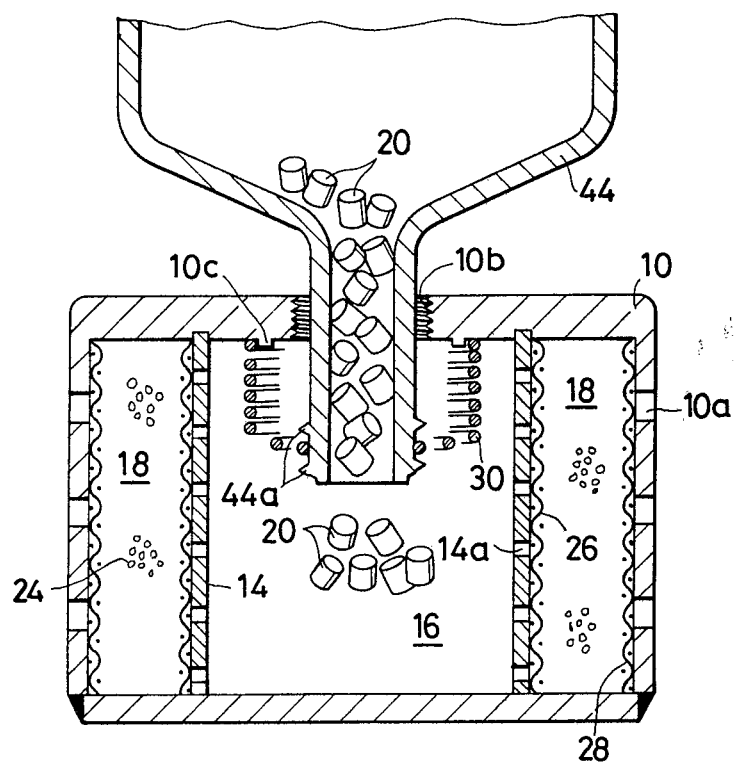

By way of example, a method of assembling the gas generator of FIG. 1 will be described with reference to FIGS. 5 and 6.

First, the helical spring 30 is placed in the housing 10 by utilizing the annular projection 10c on the inside of the housing 10. After disposition of the partition 14 and the wire screens 26 and 28, the lid plate 12 is fixed to the housing 10 as shown in FIG. 5. To introduce the gas generating pellets 20 into the combustion chamber 16 in the thus prepared housing assembly, use is made of a funnel 44 which is formed with a spiral projection 44a on the outside of the tubular end portion. The tubular end portion of the funnel 44 is once inserted deep into the housing 10 through the tap hole 10b so as to catch the free end of the helical spring 30 by the spiral projection 44a. Then the funnel 44 is pulled up to such an extent that the helical spring 30 is fully constricted towards the bottom of the housing 10 as shown in FIG. 6. In this state, the pellets 20 are put into the funnel 44 to fall into the combustion 16. The funnel 44 and/or the housing 10 may be tapped gently to assist smooth falling of the pellets 20 through the tubular portion of the funnel 44 and close packing of the pellets 20 in the combustion chamber 16. When a predetermined quantity of the pellets 20 are put into the combustion chamber 16, the funnel 44 is moved so as to disengage the helical spring 30 from the spiral projection 44a of the funnel 44. Thereafter the plug 32 (not shown in FIG. 6) is fitted to the free end of the helical spring 30 by the use of a suitable tool. Finally, the initiator 22 is screwed into the tap hole 10b of the housing 10.

The igniter of FIG. 2 can be assembled by first charging the housing 10 with the pellets 20, then inserting the helical spring 30 which is already fitted with the plug 32 into the housing 10, thereafter fitting the holed plug 13 into the housing 10 and finally screwing the initiator 22 into the tap hole 13a of the plug 13.

As demonstrated by the above described methods, charging of the gas generating pellets 20 in the combustion chamber 16 of a device according to the invention can be accomplished quite easily in comparison with a corresponding process in a conventional device using either the spacer 38 shown in FIG. 3 or the combination of the bag 40 and springs 42 shown in FIG. 4. Furthermore, the assemblage of a device according to the invention can be accomplished quite safely since the initiator 22 is not brought into contact with the pellets 20.

Figure 9:
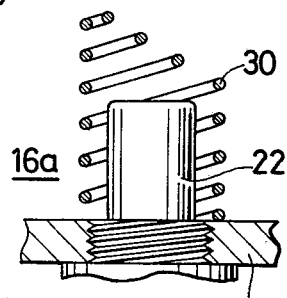
FIG. 9 shows a portion of the device of FIG. 1 for the explanation of a behavior of a retaining means employed in the device.

The use of a helical spring as a retainer member according to the invention is beneficial and convenient. However, when the helical spring 30 is a generally cylindrical one as in the embodiments of FIGS. 1 and 2, a compressive force of the spring 30 acts on the pellets 20 only in the direction axially of the helical spring 30, meaning that the pellets 20 present in the annular space 16a around the helical spring 30 are insufficiently held against the cylindrical wall of the combustion chamber 16. This becomes significant as the diameter of the helical spring 30 is made smaller relative to the diameter of the combustion chamber 16. Besides, there is a possibility that the cylindrically shaped helical spring 30 bends as shown in FIG. 9 particularly when the helical spring 30 has a relatively small diameter. Such bending of the helical spring 30 results in lowering of the resilient effect of the spring 30. The possibility of such bending of the helical spring 30 lessens as the diameter of the helical spring 30 is increased, but it is rather undesirable to increase the diameter of the helical spring 30 since it becomes necessary to enlarge the size of the housing 10 so as to maintain an effective volume of the combustion chamber 16 at a value suitable for packing of a predetermined quantity of pellets 20.

Figure 7:
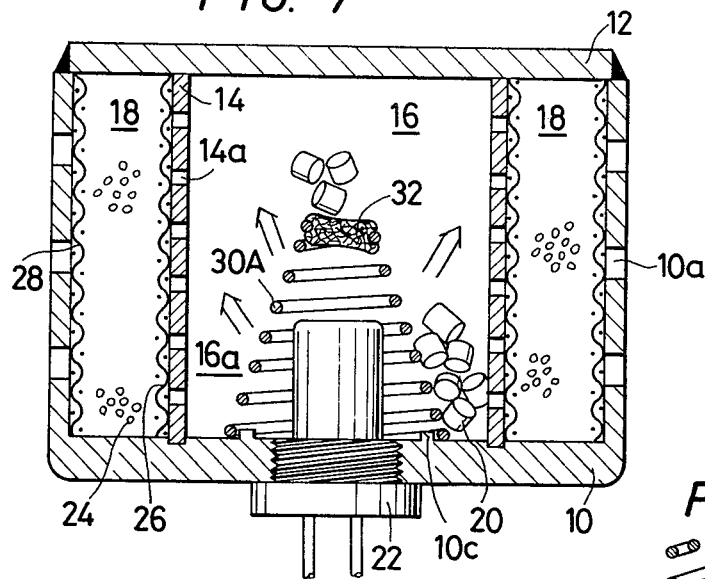
FIG. 7 shows a modification of the device of FIG. 1.
Figure 8:
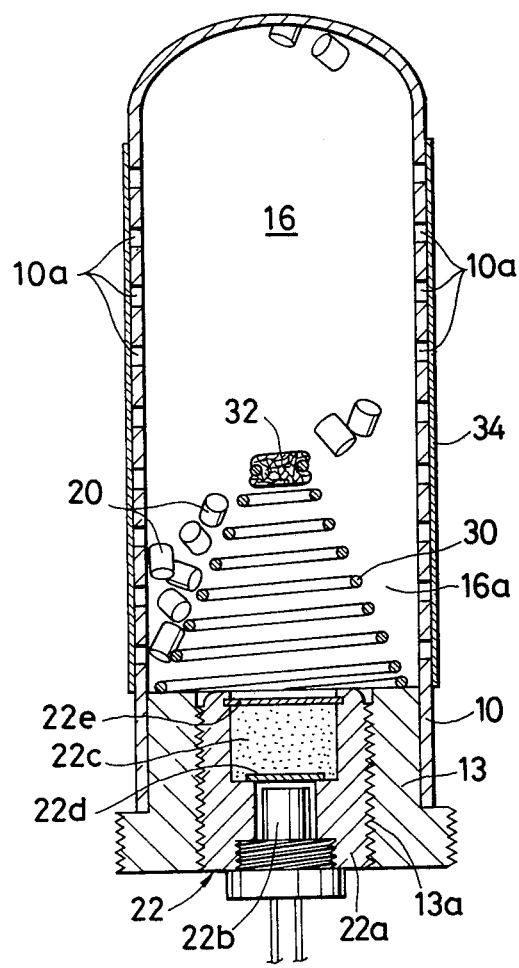
FIG. 8 shows a similar modification of the device of FIG. 2.

Referring to FIGS. 7 and 8, these problems inherent to the generally cylindrical helical spring 30 in the devices of FIGS. 1 and 2 can be solved by the use of a generally conically shaped helical spring 30A with its wider end rested on the inner surface of the bottom of the housing 10 (in FIG. 7) or the plug 13 (in FIG. 8). The conical helical spring 30A does not easily bend laterally, and a compressive force of this spring 30A acts not only in the axial direction but also in oblique directions as indicated by arrows in FIGS. 7 and 10. The narrower end of the conical helical spring 30A is closed by the aforementioned plug 32. However, the provision of the plug 32 becomes unnecessary when the opening at the narrower end of the helical spring 30A is smaller than the individual pellets 20.

Figure 10:
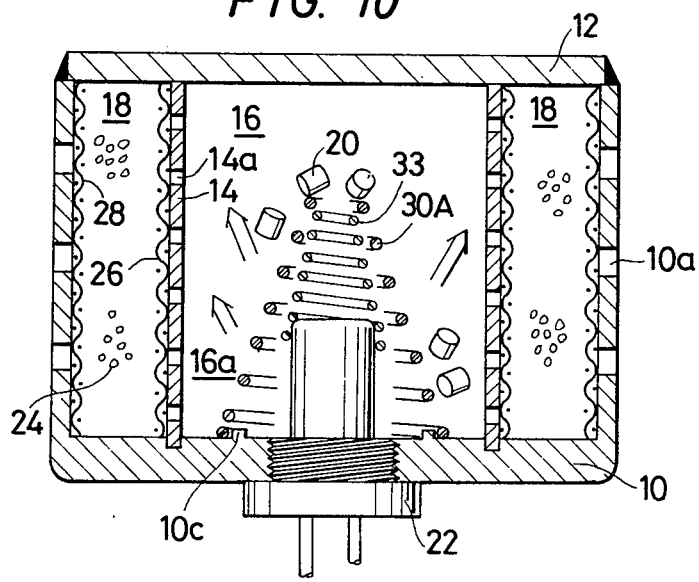
FIG. 10 shows a further modification of the device of FIG. 7.

In the production of a device according to the invention, particularly the device of FIG. 1 or FIG. 7, it is troublesome to fit the plug 32 into the free end of the helical spring 30 or 30A. Furthermore, there is a possibility of detachment of the plug 32 from the helical spring 30 or 30A by a reaction force of the pellets 20 or an impulsive force of the combustion gas. Then some of the pellets 20 will enter the interior of the helical spring 30 or 30A, with the result that the helical spring 30 or 30A no longer prevents the pellets 20 from moving around in the combustion chamber 16. Referring to FIG. 10, these problems about the plug 32 can be solved by using another helical spring 33, which is smaller in size than the helical spring 30A, in place of the plug 32. The smaller helical spring 33 is disposed in the interior of the larger helical spring 30A substantially coaxially, and one end of the smaller helical spring 33 is engaged with the free end of the larger helical spring 30A. The dimensions of the two helical springs 30A and 33 are determined such that the opening at the free end of the smaller helical spring 33 becomes smaller than the individual pellets 20. At the other end, the smaller helical spring 33 is fitted around an end portion of the initiator 22. (When applied to the device of FIG. 8, this end of the smaller helical spring 33 will be rested on the inner surface of the plug 13.) Preferably, the smaller helical spring 33 also has a generally conical shape.

Other than a helical spring, a perforated bellows made of a sheet metal serves as a retainer member according to the invention, i.e. a hollow and resilient (capable of expanding and being constricted) member. A perforated bellows is quite effective for trapping of debris projected from the initiator 22 and can be fabricated with a generally closed and small holed end.

The following is an example of experiments carried out to examine the effects of the present invention.

EXPERIMENT

Some samples of conventional gas generators of the construction of FIG. 3 were produced by varying the design of the spacer 38, and three kinds of gas generators according to the invention were produced fundamentally according to FIGS. 1, 7 and 10, respectively. The combustion chamber 16 of each sample was packed with pellets 20 (150 g in total) of a mixture of, essentially, potassium perchlorate and sodium azide.

These gas generator samples were all subjected to the following vibration test.

| Acceleration | ±4 G |
| Frequency | 15 Hz |
| Duration | 3 · 10$^6$ cycles |

This test corresponds to cumulative vibrations experienced on an average automobile during about 10 years.

The influence of the vibration on the pellets 20 in the gas generator samples was examined by disassembling a portion of the tested samples to measure the weight of a pulverized portion of the gas generating composition and also by measuring the combustion pressure of the tested gas generators in comparison with untested samples. The results of the measurements are presented in the following table, wherein the pulverization rate refers to the proportion of the pulverized gas generating composition to the total weight of the pellets initially packed in the combustion chamber.

| Type | Spacer or Retainer | Vibration test | Pulverization rate (Wt %) | Combustion pressure (kg/cm$^2$) |
| --- | --- | --- | --- | --- |
| (FIG. 3) | Not used | no | — | 59 |
| | | yes | 9.5 | 116 |
| FIG. 3 | Leaf spring | no | — | 82 |
| | | yes | 1.8 | 93 |
| FIG. 3 | Ceramic wool | no | — | 75 |
| | | yes | 4.5 | 90 |
| FIG. 1 | Cylindrical helical spring, with the plug 32 of steel wool | no | — | 62 |
| | | yes | 0.4 | 64 |
| FIG. 7 | Conical helical spring, with the plug 32 of steel wool | no | — | 62 |
| | | yes | less than 0.1 | 62 |
| FIG. 10 | Conical helical spring, with the smaller helical spring 33 | no | — | 62 |
| | | yes | less than 0.1 | 62 |

What is claimed is:
1. A combustion device comprising:
   a housing defining therein a combustion chamber;
   a plurality of pellets of a chemical composition, which undergoes self-sustaining combustion with generation of a combustion gas which may be in the form of flame, disposed in the combustion chamber, the housing having at least one aperture through which the combustion gas jets out of the housing;
   an initiator for ignition of the pellets attached to the housing so as to be exposed to the combustion chamber;
   a helical spring placed in the combustion chamber in such an arrangement that one end of the helical spring rests on a wall of the combustion chamber, that the initiator is exposed to the interior of the helical spring and that the pellets are entirely spaced from the initiator by the helical spring and held under a compressive force by resiliency of the helical spring, the pitch of the helical spring being small enough to prevent each of the pellets from passing through the gaps of the helical spring; and
   plug means engaged with the other end of the helical spring for preventing each of the pellets from entering the interior of the helical spring through an opening at said other end of the helical spring.
2. A combustion device according to claim 1, wherein said helical spring is a generally cylindrical helical spring.

3. A combustion device according to claim 1, wherein said helical spring is a generally conical helical spring of which the wider end rests on said wall of the combustion chamber.

4. A combustion device comprising:
a housing defining therein a combustion chamber;
a plurality of pellets of a chemical composition, which undergoes self-sustaining combustion with generation of a combustion gas which may be in the form of flame, disposed in the combustion chamber, the housing having at least one aperture through which the combustion gas jets out of the housing;
an initiator for ignition of the pellets attached to the housing so as to be exposed to the combustion chamber;
a helical spring placed in the combustion chamber in such an arrangement that one end of the helical spring rests on a wall of the combustion chamber, that the initiator is exposed to the interior of the helical spring and that the pellets are entirely spaced from the initiator by the helical spring and held under a compressive force by resiliency of the helical spring, the pitch of the helical spring being small enough to prevent each of the pellets from passing through the gaps of the helical spring; and
a plug fitted into the other end of the helical spring.

5. A combustion device according to claim 4, wherein said helical spring is a generally cylindrical helical spring.

6. A combustion device according to claim 4, wherein said helical spring is a generally conical helical spring.

7. A combustion device according to claim 5 or 6, wherein said combustion chamber is a cylindrical chamber, said helical spring being arranged substantially concentrically with said combustion chamber.

8. A combustion device according to claim 4, wherein said plug is made of a soft and incombustible material and has a gas permeable structure.

9. A combustion device comprising:
a housing defining therein a combustion chamber;
a plurality of pellets of a chemical composition, which undergoes self-sustaining combustion with generation of a combustion gas which may be in the form of flame, disposed in the combustion chamber, the housing having at least one aperture through which the combustion gas jets out of the housing;
an initiator for ignition of the pellets attached to the housing so as to be exposed to the combustion chamber;
a helical spring placed in the combustion chamber in such an arrangment that one end of the helical spring rests on a wall of the combustion chamber, that the initiator is exposed to the interior of the helical spring and that the pellets are entirely spaced from the initiator by the helical spring and held under a compressive force by resiliency of the helical spring, the pitch of the helical spring being small enough to prevent each of the pellets from passing through the gaps of the helical spring; and
another helical spring disposed in the interior of said helical spring, one end of said another helical spring being engaged with said other end of said helical spring, the other end of said another helical spring being rested on one end of said initiator, the inner diameter of said another helical spring at said one end being small enough to prevent each of said pellets to pass therethrough.

10. A combustion device comprising:
a housing defining therein a combustion chamber;
a plurality of pellets of a chemical composition, which undergoes self-sustaining combustion with generation of a combustion gas which may be in the form of flame, disposed in the combustion chamber, the housing having at least one aperture through which the combustion gas jets out of the housing;
an initiator for ignition of the pellets attached to the housing so as to be exposed to the combustion chamber;
a generally conical first helical spring placed in the combustion chamber in such an arrangement that a wider end of the first helical spring rests on a wall of the combustion chamber, that the initiator is exposed to the interior of the first helical spring and that the pellets are entirely spaced from the initiator by the first helical spring, the pitch of the first helical spring being small enough to prevent each of the pellets from passing through the gaps of the first helical spring; and a second helical spring disposed in the interior of the first helical spring substantially coaxially, one end of said second helical spring being engaged with a narrower end of said first helical spring, the opening of said end of said second helical spring being narrow enough to prevent each of said pellets from passing therethrough.

11. A combustion device according to claim 10, wherein said second helical spring is a generally conical helical spring.

12. A combustion device according to claim 11, wherein said combustion chamber is a cylindrical chamber, said first and second helical springs being arranged substantially concentrically with said combustion chamber.

* * * * *